(12) United States Patent
Jung et al.

(10) Patent No.: US 10,358,108 B2
(45) Date of Patent: Jul. 23, 2019

(54) ADAPTIVE, DEPLOYABLE RESTRAINT ELEMENT FOR A VEHICLE SAFETY SYSTEM, AIRBAG MODULE, AND VEHICLE SAFETY SYSTEM HAVING A RESTRAINT ELEMENT OF THIS TYPE, AND USE OF THE FIN RAY EFFECT IN AN ADAPTIVE RESTRAINT ELEMENT

(71) Applicant: TRW Airbag Systems GmbH, Aschau (DE)

(72) Inventors: Christian Jung, Mühldorf (DE); Thomas Kapfelsperger, Mühldorf (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 178 days.

(21) Appl. No.: 15/510,287

(22) PCT Filed: Sep. 10, 2015

(86) PCT No.: PCT/EP2015/001820
§ 371 (c)(1),
(2) Date: Mar. 10, 2017

(87) PCT Pub. No.: WO2016/041626
PCT Pub. Date: Mar. 24, 2016

(65) Prior Publication Data
US 2017/0282838 A1    Oct. 5, 2017

(30) Foreign Application Priority Data

Sep. 19, 2014 (DE) .......................... 10 2014 013 649

(51) Int. Cl.
*B60R 21/231* (2011.01)
*B60R 21/2334* (2011.01)
*B60R 21/235* (2006.01)

(52) U.S. Cl.
CPC .......... *B60R 21/231* (2013.01); *B60R 21/235* (2013.01); *B60R 21/2334* (2013.01); *B60R 2021/23509* (2013.01)

(58) Field of Classification Search
CPC . B60R 21/231; B60R 21/2334; B60R 21/235; B60R 2021/23509
See application file for complete search history.

(56) References Cited

U.S. PATENT DOCUMENTS 3,970,328 A * 7/1976 Wallsten ............... B60R 21/231
                                                    280/731
5,311,706 A * 5/1994 Sallee ..................... E04C 3/005
                                                    52/2.18
(Continued)

FOREIGN PATENT DOCUMENTS

DE      10119351       7/2002
DE      10260385       9/2004
(Continued)

OTHER PUBLICATIONS

Article entitled "Fin Ray Effect", May 4, 2011, pp. 1-5.

*Primary Examiner* — Darlene P Condra
(74) *Attorney, Agent, or Firm* — Tarolli, Sundheim, Covell & Tummino LLP

(57) ABSTRACT

An adaptive deployable restraint element (10) for a vehicle safety system comprising at least two leg elements (11, 12) at least in portions arranged in V-shape relative to each other between which at least one cross brace (13, 14, 15) connecting the leg elements (11, 12) is arranged, wherein the leg elements and/or the cross brace (13, 14, 15) are/is inflatable. The invention further relates to an airbag module and an occupant safety system comprising such restraint element as well as to the use of the fin ray effect in an adaptive restraint element.

23 Claims, 8 Drawing Sheets

(56) References Cited

U.S. PATENT DOCUMENTS

| | | | |
|---|---|---|---|
| 5,865,462 A | 2/1999 | Robins et al. | |
| 6,422,593 B1 * | 7/2002 | Ryan | B60R 21/232 280/730.2 |
| 6,722,691 B1 | 4/2004 | Haland et al. | |
| 7,448,644 B2 * | 11/2008 | Zhong | B60R 21/231 280/729 |
| 8,876,156 B2 * | 11/2014 | Turnbull | B60R 21/233 280/729 |
| 2004/0174003 A1 * | 9/2004 | Dominissini | B60R 21/233 280/729 |
| 2010/0263803 A1 * | 10/2010 | Kniese | E06B 3/80 160/127 |
| 2011/0049846 A1 | 3/2011 | Hirth et al. | |
| 2011/0175334 A1 * | 7/2011 | Miller | B60R 21/206 280/730.2 |
| 2012/0133114 A1 * | 5/2012 | Choi | B60R 21/214 280/728.2 |
| 2013/0088056 A1 * | 4/2013 | Quatanens | B60R 21/233 297/216.13 |
| 2013/0278028 A1 | 10/2013 | Gaeng et al. | |
| 2014/0265260 A1 * | 9/2014 | Bogenrieder | B60R 21/205 280/728.1 |
| 2015/0203066 A1 | 7/2015 | Pausch et al. | |
| 2016/0001735 A1 * | 1/2016 | Quatanens | B60R 21/233 244/121 |
| 2017/0320468 A1 * | 11/2017 | Merz | B29C 45/33 |

FOREIGN PATENT DOCUMENTS

| | | |
|---|---|---|
| DE | 102005035196 | 2/2007 |
| DE | 102013202036 | 8/2014 |
| EP | 1477372 | 11/2004 |
| JP | 2009067330 | 4/2009 |

\* cited by examiner

ADAPTIVE, DEPLOYABLE RESTRAINT ELEMENT FOR A VEHICLE SAFETY SYSTEM, AIRBAG MODULE, AND VEHICLE SAFETY SYSTEM HAVING A RESTRAINT ELEMENT OF THIS TYPE, AND USE OF THE FIN RAY EFFECT IN AN ADAPTIVE RESTRAINT ELEMENT

RELATED APPLICATIONS

This application corresponds to PCT/EP2015/001820, filed Sep. 10, 2015, which claims the benefit of German Application No. 10 2014 013 649.3, filed Sep. 19, 2014, the subject matter of which are incorporated herein by reference in their entirety.

BACKGROUND OF THE INVENTION

The invention relates to an adaptive deployable restraint element for a vehicle safety system. Furthermore, the invention relates to an airbag module and a vehicle safety system for a vehicle comprising such restraint element. Moreover, the invention states the use of the fin ray effect in an adaptive restraint element.

Deployable restraint elements, especially in the form of airbags, have been standard in the safety equipment of automotive vehicles for years. The airbags usually comprise an airbag confined by textile material which is inflated with the aid of an inflator in the case of crash. The airbag expands between a vehicle occupant and vehicle parts so as to prevent any contact between the vehicle occupant and the rigid body structure. In general, it is required to design airbags so that they can be used for different vehicle occupants who may differ especially as to their body size and/or mass. In so far, there is a need to design such restraint elements to be adaptable and adaptive, respectively. This is usually performed by gas outlet orifices which are incorporated in the textile wrapping material of the airbag. The gas used for inflating the airbag may flow out through the gas outlet orifices in a controlled manner so that the airbag can adapt to different crash scenarios solely by varying the pressure prevailing inside the airbag. In addition, the adaptability of the airbag may be brought about by multi-stage, especially two-stage, airbag inflators so that the gas filling amount inside the airbag may be increased, where needed. Such two-stage inflators require complicated control and include a structurally complex design.

SUMMARY OF THE INVENTION

It is the object of the invention to state an adaptive deployable restraint system including a specific restraint capacity which is at least partly independent of the gas pressure inside the restraint system. It is an additional object of the invention to state an airbag module and an occupant safety system comprising such restraint system.

In accordance with the invention, this object is achieved with respect to the restraint system by the subject matter of claim 1, with respect to the airbag module by the subject matter of claim 17, with respect to the occupant safety system by the subject matter of claim 18 as well as according to an independent aspect of use by the subject matter of claim 22.

Especially, the invention is based on the idea to provide an adaptive deployable restraint element for a vehicle safety system comprising at least two leg elements which are arranged in V-shape relative to each other at least in portions and between which at least one cross brace is arranged for connecting the leg elements. The leg elements and/or the cross brace are/is inflatable.

The restraint element according to the invention differs from conventional airbags by the structure of leg elements and cross braces. The latter imitate a principle known from other technical fields which is referred to as fin ray effect. Especially in industrial robotics gripper elements are tested which automatically adapt to the contour of the object to be gripped and make use of the fin ray effect for said adaptability. The underlying technical principle is borrowed from the osseous structure of fish fins which, when force is punctually applied, do not evade in the direction of force but the point of which surprisingly moves in a direction opposed to the effective direction of force. Hence such fish fin is curved in the opposite direction by the punctual application of force.

In the invention, this principle is conferred upon an adaptive deployable restraint element. This constitutes a shift of paradigm, as in contrast to conventional restraint elements, especially airbags, the adaptability to different crash scenarios is not controlled primarily by the pressure prevailing inside the restraint element but rather by the structure of the restraint element itself.

In the leg elements provided in the restraint element according to the invention which are arranged in V-shape relative to each other and are connected to one or more cross braces the structure of an osseous fish fin is imitated. Accordingly, the leg elements and/or the cross brace(s) is/are inflatable so that the restraint element can quickly deploy and offers impact protection for a vehicle occupant in the manner of an airbag. At the same time, the fin-type structure of the restraint element enables the later to adapt to the crash scenario in the inflated state. Especially, body parts of the vehicle occupant immersing into the restraint element may be enclosed so that the body part is simultaneously guided during the crash. This reduces the risks of injuries.

At the same time, the invention helps to achieve that the gas volume required for inflating the restraint element is reduced, as it is not the entire volume of a conventional airbag that has to be filled with gas, but merely the cross brace(s) and/or the leg elements of the restraint element have to be filled. Accordingly, the entire restraint element may in total occupy a volume corresponding to the volume of a conventional airbag. On the other hand, the restraint element according to the invention preferably includes breakthroughs, however, which are confined by the leg elements and the cross brace(s) and need not be filled with gas. Consequently, in the invention the gas almost exclusively has the task to deploy the restraint element and to stabilize the structure thereof. The adaptability to a particular crash scenario is realized, in contrast, by the structure and the constructional design of the restraint element itself.

Due to the amount of gas reduced as compared to conventional airbags, the restraint element according to the invention is robust and substantially independent of external ambient conditions such as temperature and/or pressure or in any case dependent to a reduced degree only. Finally, the improved adaptability of the restraint element according to the invention allows to dispense with two-stage inflators, where appropriate, so that the production costs and the expenditure for the complicated control of two-stage inflators can be reduced. In general, also due to the comparatively small amount of gas required for inflating the restraint element according to the invention, relatively small inflators may be used, which equally has an effect on the production costs.

According to a preferred embodiment of the invention, the restraint element is provided to have an outer contour which is triangular or diamond-shaped in cross-section. The triangular outer contour is defined primarily by the leg elements arranged relative to each other in V-shape. It is also possible that the restraint element in cross-section exhibits two triangular shapes mirrored by a basis of the leg elements so that in total a diamond-shaped outer contour is resulting in cross-section of the restraint element. In other words, in cross-section the restraint element may include two portions each of which is formed of leg elements arranged in V-shape relative to each other. The two portions preferably are directly adjacent each other so that the restraint element in total has a diamond-shaped outer contour in cross-section, in so far the basic contour of a triangle which forms a stable basis for realizing the fin ray effect is maintained.

Moreover, the restraint element may have an outer contour that is circular or oval or longitudinally curved in the longitudinal section. Depending on the site of use of the restraint element within a vehicle occupant safety system different shapes are of advantage. For example, the restraint element for use as a driver airbag may have an outer contour circular in the longitudinal section. The circular outer contour (longitudinal contour) of the restraint element may be formed, for example, by rotation of the triangular cross-sectional contour. In other words, the restraint element may have a rotationally symmetric shape so that in a longitudinal section a circular outer contour is evident and in cross-section a triangular outer contour is evident. The outer contour of the restraint element in the longitudinal section may also be oval, wherein in cross-section preferably a diamond-shaped outer contour is equally evident. The longitudinally curved outer contour of the restraint element which is an alternative option preferably shows by the fact that at their connecting point the leg elements form a ridge extending in curved shape.

In a preferred configuration of the invention, the leg elements are formed by a textile, especially flexible fabric panel or by plural interconnected textile, especially flexible, fabric panels. The textile fabric panels may be flat and may interconnect the cross braces. It is also possible for the textile fabric panels to confine compartments so that the leg elements are inflatable. In particular, the textiles used for conventional airbags may be used. The fabric panels may include air inlet orifices between the cross braces so that ambient air may enter into free spaces formed between the cross braces.

The leg elements are preferably provided to converge into a Joint point, especially to be connected to a joint point. The point may form a free end of the restraint element. In order to expediently realize the fin ray effect it is further provided in a preferred embodiment that plural cross braces are arranged between the leg elements. Preferably, the length of the cross braces is reduced toward the joint point. In other words, the cross brace that is closest to the joint point has a length which is shorter than the length of the respective other cross braces. In total, the cross braces therefore may be arranged rung-like between the legs in the cross-section of the restraint element. Preferably, in cross-section the entire restraint element forms a ladder-type structure with the cross braces forming rungs of the ladder and the leg elements forming the side parts which are converging into a point.

The cross braces may be arranged in parallel to each other in the restraint element according to the invention. Alternatively, the cross braces may form an angle with each other. It may especially be provided that the at least one cross brace encloses the same angle with each of the two leg elements which are connected by the cross brace. The cross brace thus confines an isosceles triangle with the leg elements and the point of the restraint element. Alternatively, the cross brace may extend obliquely between the leg elements so that the cross brace encloses different angles with the two leg elements which are connected by the cross brace. All or part of the cross braces may form an isosceles triangle with the leg elements or may enclose different angles with the leg elements. Each of the afore-stated approaches relates to the cross-section of the restraint element.

In another preferred embodiment of the restraint element according to the invention, the spaces between the cross braces along a rear-side leg element are provided to be larger than along a front-side leg element. In this case, the cross braces are preferably arranged at angles with each other. In particular, a lowermost cress brace may form an isosceles triangle with the leg elements and the point of the restraint element. A cross brace arranged directly there above may be tilted so that the space between the cross braces at the front-side leg element is smaller than at the rear-side leg element. A third cross brace which is arranged above the two cross braces may have a larger angle with the first cross brace so that the space between the second cross brace and the third cross brace along the front-side leg element is smaller than along the rear-side leg element it has turned out that such structure of the restraint element is especially well suited for adaptively absorbing impact forces.

It is pointed out in this context that the restraint element deploys as part of an occupant safety system in a vehicle preferably in such way that the front-side leg element faces a vehicle occupant and the rear-side leg element is turned away from the vehicle occupant. Hence, during crash the vehicle occupant immerses into the front-side leg element.

It may further be provided that each cross brace forms an individual fluid chamber which is connected to the leg elements in a fluid-tight manner. Accordingly, the leg elements may be designed to be inflatable or non-inflatable. For example, a dart may be disposed between the cross braces and the leg elements. The dart may be designed so that a fluid communication between the cross braces and the leg elements is closed in a gastight manner. It is also possible to design the dart such that the fluid communication is tapered between the cross braces and the leg elements. In so far, there may be a fluid communication which permits only a reduced gas flow between the leg elements and the cross braces, however. In this way, the mode of deploying the restraint element can be influenced.

Preferably between two adjacent cross braces at least one free space is provided, with a height of the free space being many times larger than a thickness of the cross braces and/or of the leg elements. Especially the height of the free space may be many times larger than a thickness of the cross braces and/or of the leg elements in the inflated state. The height of the free space and the thickness of the cross braces and, resp., of the leg elements are preferably established in the cross-section of the restraint element. Accordingly, the height of the free space corresponds to the space between two cross braces relative to each other or to the space between the point of the restraint element and the first cross brace of the restraint element closest to the point. The thickness of the cross braces and/or of the leg elements may correspond to the diameter of the cross braces and/or leg elements in the inflated state, when the cross braces and/or the leg elements are tube-shaped. In concrete embodiments the height of the free space may be larger by at least five times, especially by at least ten times, especially by at least twenty times the thickness of the cross braces and/or of the leg elements. This is preferably applicable to all free spaces within the restraint element. Of preference, all cross braces have the same thickness. Equally the leg elements may have identical thicknesses. It may be further provided for the cross braces and/or the leg elements to have a uniform thickness.

The leg elements may be directly fluid-communicated with each other so that they form a V-shaped fluid chamber. As an alternative, it is possible that each of the leg elements forms a separate fluid chamber. In addition, a dart may be arranged between the leg elements in the area of the point which dart tapers or closes a fluid communication between the leg elements in a gastight manner.

The cross braces are preferably fluid-communicated with the leg elements, especially with the V-shaped fluid chamber, so that the restraint element forms a joint airbag. In other words, the restraint element may be inflatable completely and to the full extent. For inflating the restraint element one single inflator may be sufficient in this configuration so that in total the number of the components of an airbag module for such restraint element is reduced.

In an independent aspect, the invention is based on the idea to provide an adaptive deployable restraint element for a vehicle safety system having a skeleton-type structure comprising one or more fluid chambers, wherein the skeleton-type structure is configured so that the restraint element experiences a movement and/or curvature directed against the force pulse (tin ray effect) at least in portions by the action of a force pulse.

The restraint element may be configured especially in the afore-described manner.

Another independent aspect of the invention relates to an airbag module comprising an afore-described restraint element and an inflator that is fluid-communicated with a cross brace and/or a leg element and/or a fluid chamber of the restraint element. The inflator may be a hybrid inflator comprising a gas cartridge or a pyrotechnical inflator having ignitable gas-generating solids. The inflator may be of the single-stage or two-stage type. Preferably, the inflator can be electrically activated and generates a sufficiently large amount of gas so as to deploy the restraint element and to fill the fluid chambers with gas, respectively.

Moreover, the invention relates to an occupant safety system for a vehicle comprising an afore-described restraint element and/or an afore-described airbag module, in the occupant safety system according to the invention it may be provided, in preferred configurations, that the restraint element includes two base ends and a point opposed to the base ends, wherein the base ends can be or are fixed to be stationary in the vehicle and the point projects freely into an interior of the vehicle in a deployed state of the restraint element. The base ends may be formed especially by the longitudinal ends of the leg elements. In concrete configurations of the occupant safety system the restraint element, especially the base ends, is/are provided to be connected to a vehicle roof, especially a roof lining, and in the deployed state to extend in the direction of a vehicle floor, especially vertically, through the interior of the vehicle. In this way, it is possible to properly protect especially occupants in the rear compartment of a vehicle in the case of crash.

In another preferred configuration of the occupant safety system, the restraint element, especially the base ends, may be fixed between two seats juxtaposed in the driving direction, especially within or on a center console, and may extend transversely over a seat in the deployed state. Such configuration is suited especially for the protection of the driver and the passenger of an automotive vehicle.

Furthermore, within the scope of the present application the use of the fin ray effect in an adaptive restraint element for impact protection for a vehicle occupant is disclosed and claimed, wherein the adaptive restraint element comprises inflatable leg elements and/or cross braces. The adaptive restraint element is formed, for example, by an afore-described restraint element.

BRIEF DESCRIPTION OF THE DRAWINGS

Hereinafter the invention shall be illustrated in detail by way of embodiments with reference to the enclosed schematic drawings, wherein.

DESCRIPTION

Figure 1:
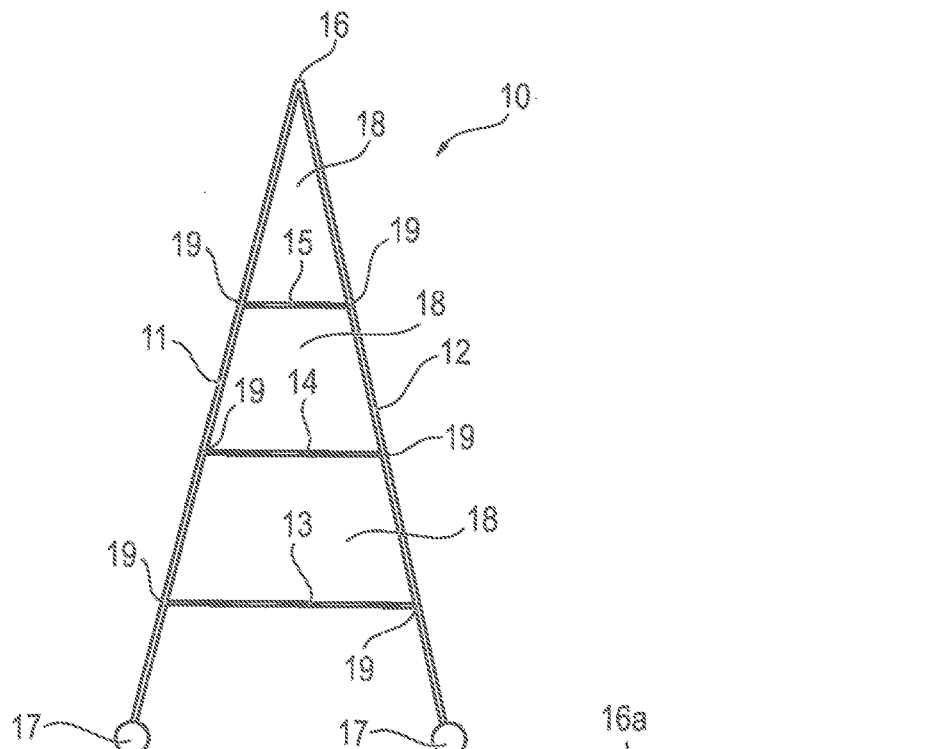
FIG. 1 shows a cross-sectional representation of a restraint element according to the invention in accordance with a preferred embodiment.
Figure 2:
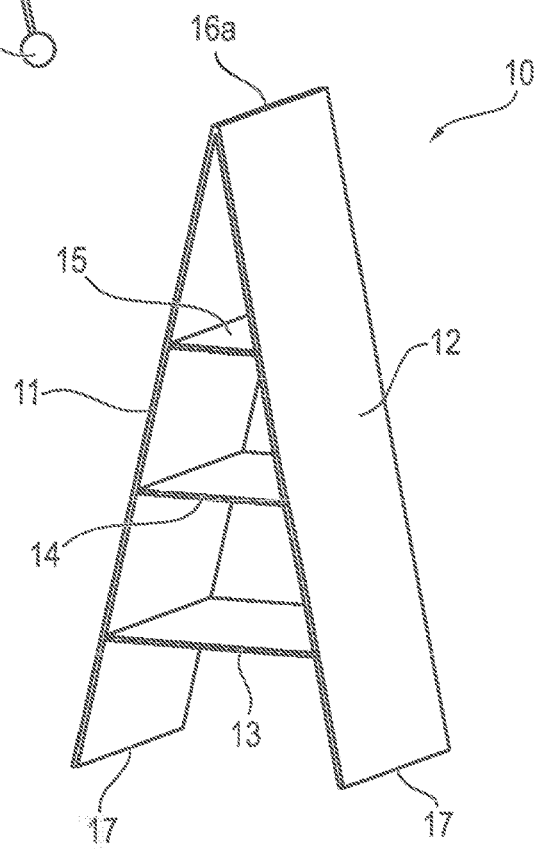
FIG. 2 shows a perspective view of the restraint element according to FIG. 1.

In FIGS. 1 and 2 a restraint element 10 which is adapted to be used in a vehicle safety system is schematically shown.

The restraint element 10 preferably is part of the passive vehicle safety and is mounted to be covered in the non-activated state on or in the vehicle. The restraint element 10 is deployable so that it may become active in the case of crash. The restraint element 10 in addition is adaptive in so far as it is capable of adapting to different crash scenarios. Different crash scenarios will especially occur from different impact velocities and/or size and, resp., mass (weight) of the vehicle occupant 30 to be protected.

The restraint element 10 comprises two leg elements 11, 12 which are arranged in V-shape relative to each other. In particular, the leg elements 11, 12 are convergent and form a point 16. The leg elements 11, 12 are interconnected in the area of the point. Cross braces 13, 14, 15 which interconnect the leg elements 11, 12 extend between the leg elements 11, 12. In the cross-sectional view according to FIG. 1 it is clearly visible that the cross braces 13, 14, 15 are arranged rung-like between the leg elements 11, 12. In total, the restraint element 10 thus forms in cross-section a ladder-type structure having rung-like cross braces 13, 14, 15 the length of which reduces toward the point 16.

In FIG. 1 base ends 17 are emphasized at the longitudinal ends of the leg elements 11, 12. The base ends 17 are opposed to the point 16 of the restraint element 10. In the mounted state of the restraint element inside a vehicle 20 the base ends 17 are anchored preferably in a stationary manner on a vehicle component. In this way, any relative movement between the base ends 17 is avoided.

In FIGS. 1 to 4 the leg elements 11, 12 and the cross braces 13, 14, 15 are schematically shown as lines or areas to simplify matters. It is in fact provided that the cross braces 13, 14, 15 and/or the leg elements 11, 12 are designed to be inflatable. In this way, the leg elements 11, 12 may be fluid-communicated in the area of the point 16 and may form a joint fluid chamber. In addition, the cross braces 13, 14, 15 may form separate fluid chambers or fluid chambers that are connected to the joint fluid chamber of the leg elements 11, 12. It may especially be provided that in the connecting areas 19 between the cross braces 13, 14, 15 and the leg elements 11, 12 darts are arranged for separating the fluid chambers formed by the leg elements 11, 12 and the cross braces 13, 14, 15 from each other so as to prevent fluid exchange between the individual fluid chambers.

As is clearly evident from FIG. 2, the restraint element 10 includes a longitudinal extension so that the connection in cross-section evident as a point forms a ridge 16a between the leg elements 11, 12. The ridge 16a extends in the longitudinal direction of the restraint element 10. In the embodiment according to FIGS. 1 and 2, the cross braces 13, 14, 15 are arranged in parallel to each other and in cross-section term an isosceles triangle with each of the leg elements 11, 12. In other words, the angle in each of the connecting areas 19 between the individual cross braces 13, 14, 15 and the leg elements 11, 12 is equal in the concrete configuration shown here three cross braces 13, 14, 15 are configured, wherein a first cross brace 13 is further distant from the point 16 and the ridge 16a of the restraint element 10 than a third cross brace 15 which is arranged closest to the point 16 and, resp., the ridge 16a. A second cross brace 14 extends between the first cross brace 13 and the third cross brace 16. The space between the cross braces 13, 14, 15 is substantially equal in the shown embodiment. It is also possible that the spaces between the cross braces 13, 14, 16 are different. The spaces between the cross braces 13, 14, 15 form free spaces 18 which in the inflated state of the restraint element 10 are preferably filled with ambient air. It is preferably provided for each of the free spaces 18 to have a height that is larger than the thickness of the cross braces 13, 14, 15 and/or the leg elements 11, 12. The thickness of the cross braces 13, 14, 15 and the leg elements 11, 12 is preferably established in cross-section of the restraint element 10. In the case of tubular leg elements 11, 12 and/or tubular cross braces 13, 14, 15 the thickness corresponds to the respective cross-sectional diameter. The height of the free spaces 18 is equally established by the cross-section of the restraint element 10 and substantially corresponds to the space between the cross braces 13, 14, 15 and, resp., to the space between the third cross brace 15 and the point 16 and, resp., the ridge 16a of the restraint element.

It may be provided in the restraint element according to FIGS. 1 and 2, for example, that only the cross braces 13, 14, 15 are inflatable, whereas the leg elements 11, 12 comprise a fabric panel disposed between the cross braces 13, 14, 15. It is also possible that the leg elements are inflatable at least in portions. For example, the edges at the longitudinal ends of the restraint element 10 may be formed by tubular inflatable portions of the leg elements 11, 12, wherein textile, especially flexible, fabric panels which are connected to the cross braces 13, 14, 15 extend between the inflatable portions of the leg elements 11, 12.

Figure 3:
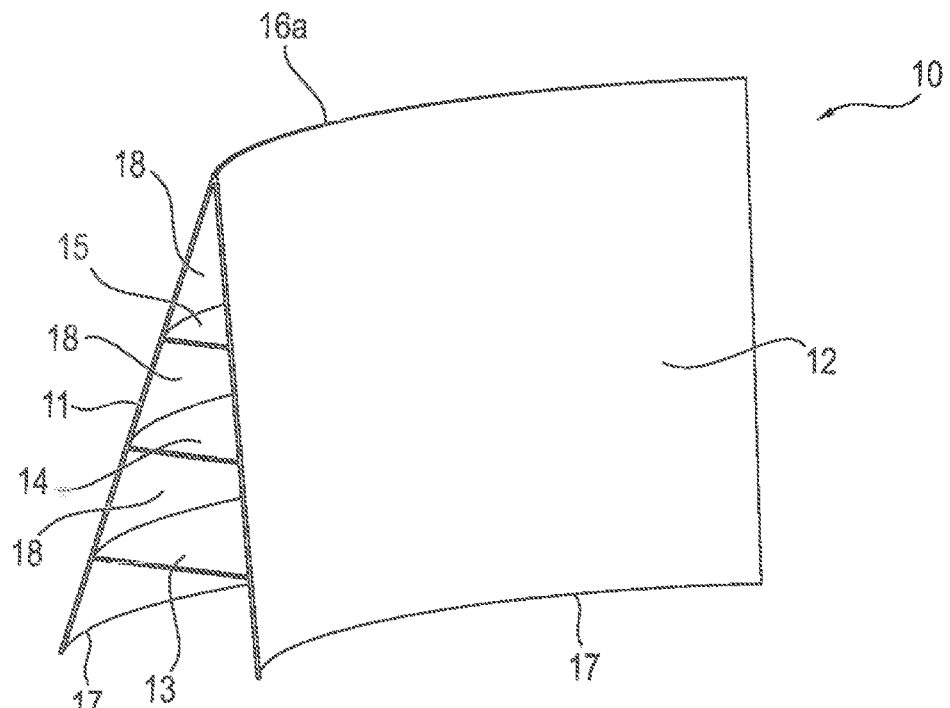
FIG. 3 shows a perspective view of a restraint element according to the invention in accordance with a further preferred embodiment, with the restraint element having a curved outer contour.

The embodiment according to FIG. 3 is similar to the embodiment according to FIGS. 1 and 2, especially as regards the cross-sectional structure of the restraint element 1. In particular, the restraint element 10 has a cross-sectional geometry which substantially corresponds to the cross-sectional geometry according to FIG. 1. In contrast to the embodiment according to FIG. 2, the restraint element 10 according to FIG. 3 has an outer contour being curved in the longitudinal section. A leg element 11 arranged on the outside of the curvature forms a front-side leg element 11, wherein a leg element 12 arranged on the inside of the curvature forms a rear-side leg element 12. A reverse definition of the front-side leg element 11 and of the rear-side leg element 12 is possible. In any case, the front-side leg element 11 is provided to face a vehicle occupant 30 in the mounted state within a vehicle, whereas a rear-side leg element 12 is turned away from a vehicle occupant 30 in the mounted state. The curvature of the restraint element 10 according to FIG. 3 is clearly visible from the ridge 16a extending in the longitudinal direction of the restraint element 10 in a curved, especially arcuate manner.

Figure 4:
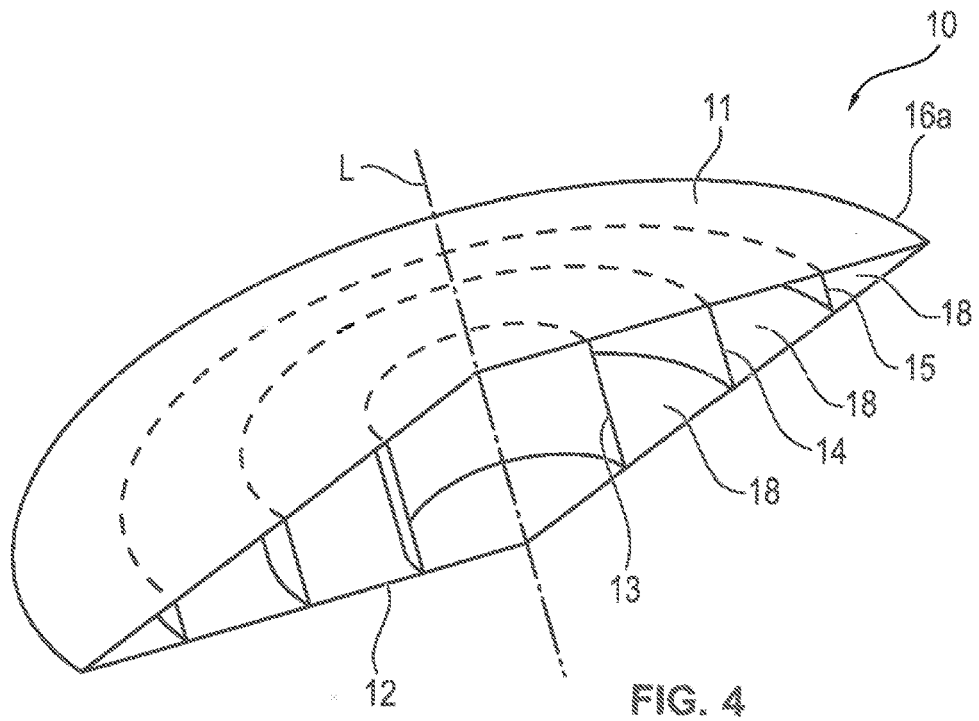
FIG. 4 shows a perspective partially sectional view of a restraint element according to the invention in accordance with a further preferred embodiment, with the restraint element having an outer contour which is circular in longitudinal section.

FIG. 4 illustrates an alternative embodiment of the restraint element 10. The restraint element 10 comprises two leg elements 11, 12 which are arranged, in portions, in V-shape relative to each other and form a point 16 and, resp., a ridge 16a. The cross-sectional contour of the restraint element 10 according to FIG. 4 substantially corresponds to the cross-sectional contour according to FIG. 1 which is rotated about an axis of rotation L. In this respect, the restraint element 10 constitutes a rotationally symmetric or a circular outer contour in longitudinal section. Especially the ridge 16a has a circular course. In so far, a peripheral ridge 16a is formed at the outer edge of the restraint element 10.

The cross braces 13, 14, 15 of the restraint element 10 extend, analogously to the cross-sectional geometry according to FIG. 1, in parallel to each other between the leg elements 11, 12 and interconnect the latter. Due to the rotationally symmetric configuration of the restraint element 10 according to FIG. 4, the cross braces 13, 14, 15 in total have an annular design, however. The annularly designed cross braces 13, 14, 5 are arranged concentrically to each other with respect to the axis of rotation L and have different ring diameters. Between the cross braces 13, 14, 15 free spaces 18 are formed which are covered by the leg elements 11, 12. Especially the free spaces 18 are closed by the cross braces 13, 14, 15 and the leg elements 11, 12. In order to enable the restraint element 10 to deploy it is therefore provided that air inlet orifices are disposed in the leg elements 11, 12 so that ambient air may penetrate the free spaces 18. The air inlet orifices are not shown in FIG. 4 for the sake of clarity.

Figure 5:
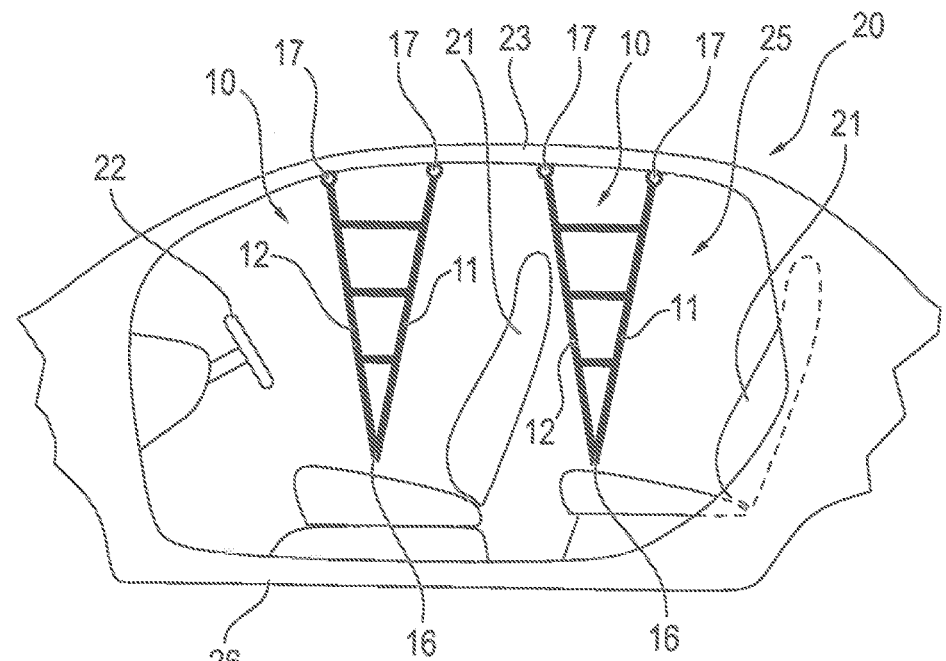
FIG. 5 shows a longitudinal sectional view of a vehicle comprising the restraint element according to the invention in accordance with FIG. 1, with the restraint element being fastened in the vehicle roof.

FIG. 5 shows a preferred mounting position of the restraint element 10 according to FIGS. 1 and 2. In particular, FIG. 5 shows a lateral view of a vehicle 20 comprising seats 21, a steering wheel 22 and a vehicle roof 23. The seats 21 are connected to a vehicle floor 26. In the shown embodiment restraint elements 10 are provided both for the front vehicle occupants 30 and for the rear vehicle occupants 30. The restraint elements 10 are fastened by their base ends 17 on the vehicle roof 23 and, resp., are anchored in the roof lining. In the deployed state, i.e. after activation of the restraint element 10, the restraint elements 10 extend substantially vertically through the interior 25 of the vehicle 20. The point 16 and, resp., the ridge 16a is directed toward the vehicle floor 28. The restraint elements 10 preferably deploy level with or ahead of the seats 21 so that in the case of frontal impact a vehicle occupant 30 is absorbed by the restraint element 10. The restraint elements 10 in total have a height sufficient to absorb at least the head 31 of a vehicle occupant 30.

Figure 9A:
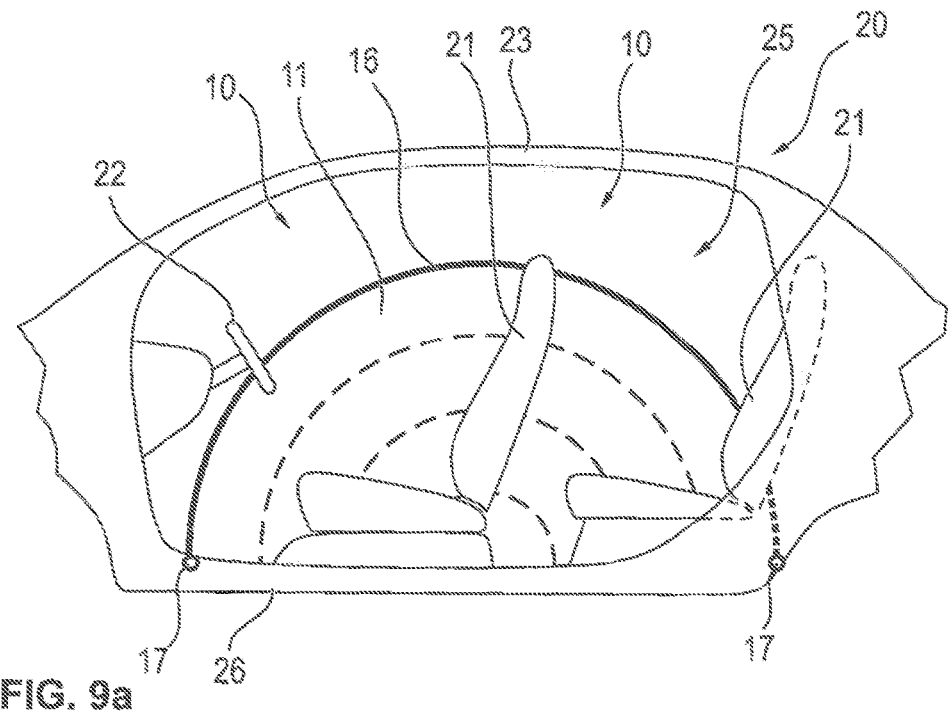
FIG. 9a shows a longitudinal sectional view of a vehicle comprising a restraint element according to the invention in accordance with FIG. 1, with the restraint element being fastened on the vehicle floor and extending along the side doors.
Figure 9B:
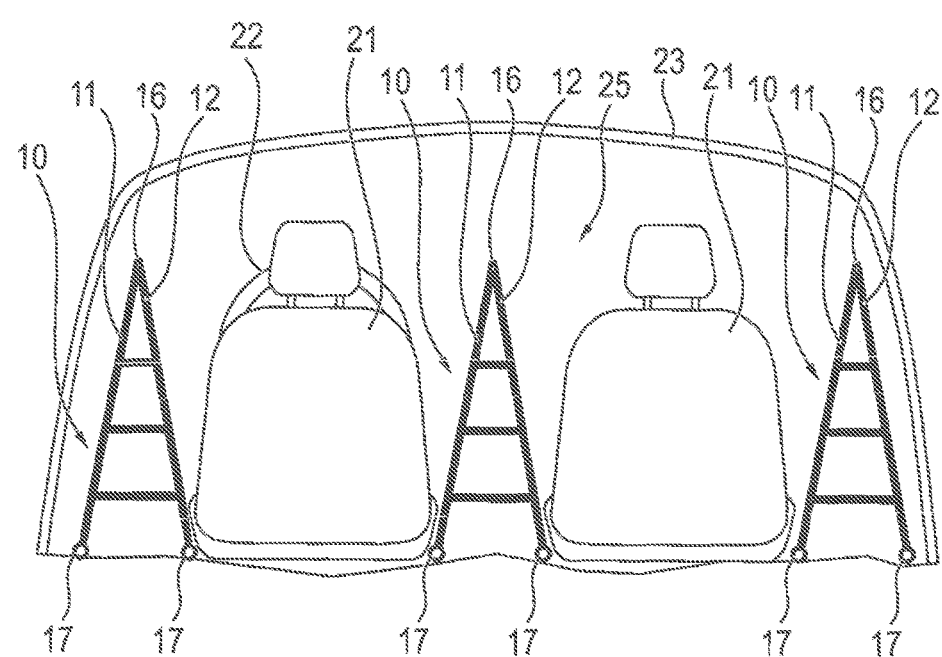
FIG. 9b shows a sectional view across the vehicle according to FIG. 9a with plural possible mounting positions of a restraint element according to FIG. 1 which is anchored on the vehicle floor.

The restraint element 10 may also be used as a side airbag or window airbag. The restraint element 10 may be positioned especially at the window sides of a vehicle 20 or along the side doors, respectively. FIG. 9a illustrates an embodiment in which the restraint element 10 is fixed by its base ends 17 to the vehicle floor 26. In the deploying state and, resp., after activation of the restraint element 10 the latter extends substantially vertically upwards along the side doors. It is also possible that such restraint element which is anchored on the vehicle floor 26 is deployed between the seats and, resp., the occupants so as to prevent the vehicle occupants seated next to each other from contacting each other in the case of crash, for example. The possible ways of positioning the restraint element 10 are exemplified in FIG. 9b. Accordingly, FIG. 9b shows a sectional view across a vehicle 20. Each of the restraint elements 10 shown in the deployed state extends between the side walls or side doors 27, resp., and the vehicle seats 21 and, respectively, between the vehicle seats 21. It is pointed out that the representation according to FIG. 9b merely shows the positioning options of the restraint element 10 in a vehicle 20. It is certainly possible that a restraint element 10 is evident only at the side doors 27 or only between the seats 21.

Figure 10A:
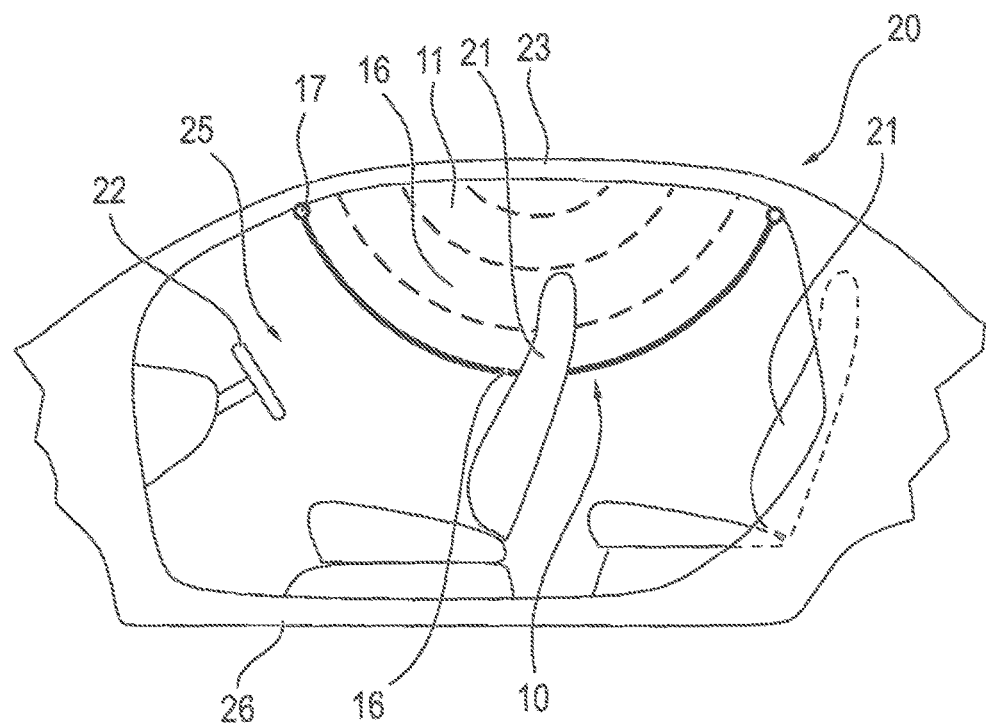
FIG. 10a shows a longitudinal sectional view of a vehicle comprising a restraint element according to the invention in accordance with FIG. 1, with the restraint element being fastened in the roof and extending along the side windows of the vehicle.
Figure 10B:
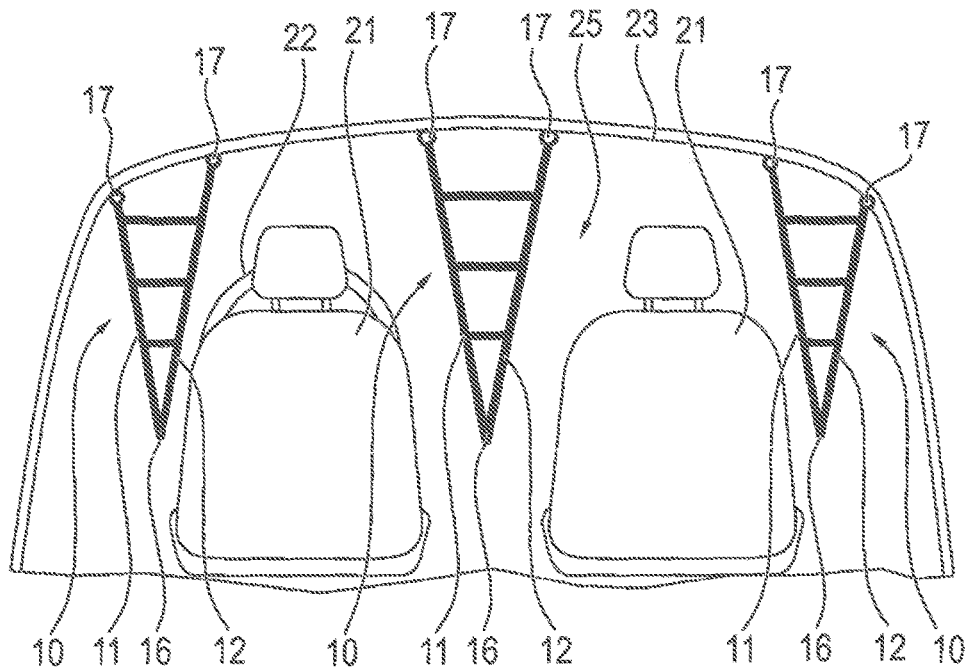
FIG. 10b shows a sectional view across the vehicle according to FIG. 10a with various mounting options of the restraint element.

Alternatively, the restraint elements 10 arranged between the seats 21 or between the side doors 27 and the seats 21 can also deploy starting from the vehicle roof 23. Such variant is exemplified in the FIGS. 10a and 10b. FIG. 10a shows a side view of a vehicle 20, with the restraint element 10 which is fastened with its base ends 17 to the vehicle roof 23 and, resp., is anchored in the roof lining spans over the side windows of the vehicle 20. In the inactivated state the restraint element 10 is preferably completely immersed in the roof lining and in so far is not directly visible for a vehicle occupant, FIG. 10 shows, substantially analogously to FIG. 9b in a cross-sectional view of the vehicle 20, the different options of positioning the restraint element 10. It is especially provided that the restraint element 1 can extend between the side windows and the seats 21 and/or between the seats 21 starting from the vehicle roof 23 in the direction of the vehicle floor 26.

Figure 11:
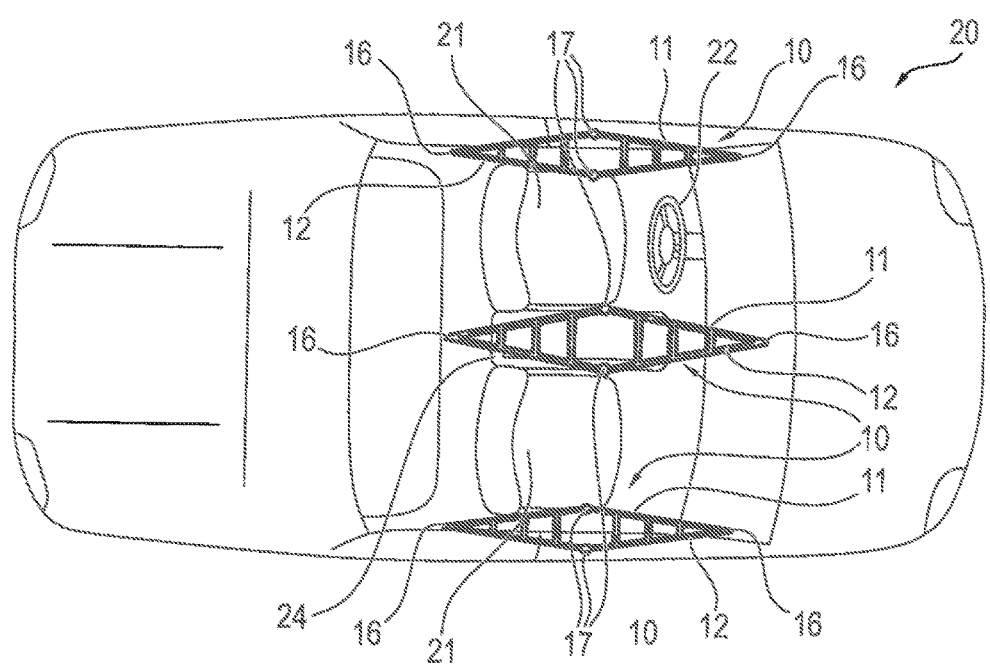
FIG. 11 shows a top view onto a vehicle with further possible mounting positions of a restraint element according to the invention.

FIG. 11 shows a top view onto the vehicle 20 and illustrates the mounting options of the restraint element 10 explained in the cross-sectional views and side views according to FIGS. 9a to 9b. It is evident that the restraint element 10 may be arranged, on the one hand, between the side doors 27 and a vehicle seat 21 and/or between the vehicle seats 21. Accordingly, the restraint element 10 extends either from the vehicle floor 26 or is anchored in the vehicle roof 23 and extends in the direction of the vehicle floor 26. It is generally provided that the mounting positions shown in FIGS. 9a to 11 impart the function of a side airbag or a window airbag to the restraint element 10. In these the restraint element 10 thus serves for protecting the vehicle occupants in the case of a lateral impact.

Figure 6:
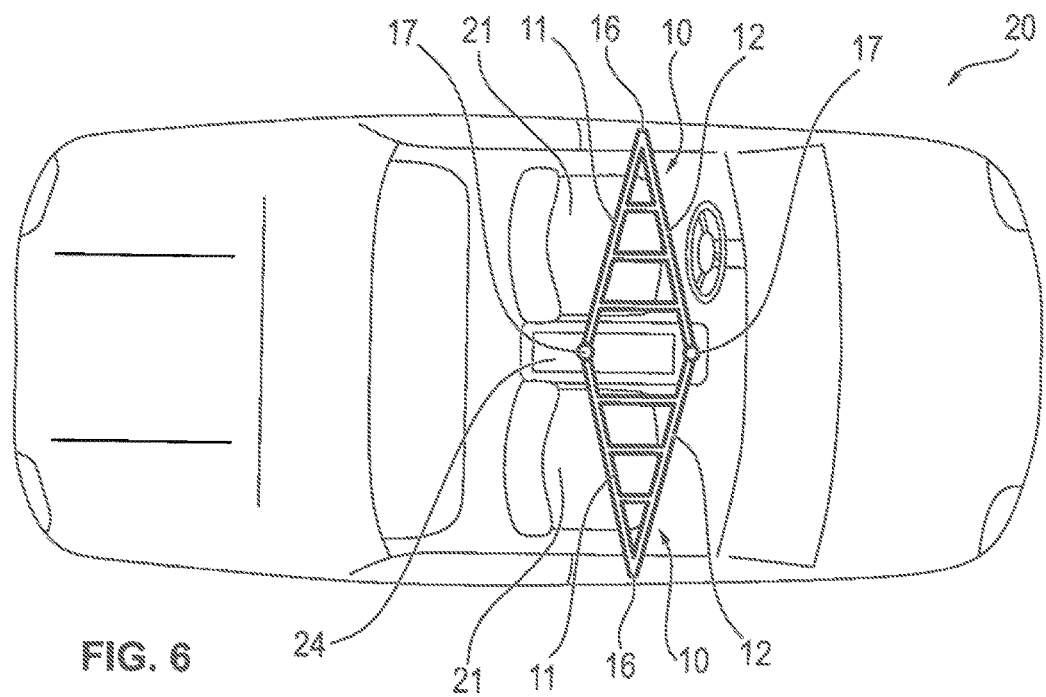
FIG. 6 shows a top view onto a vehicle comprising two restraint elements according to FIG. 1 which are fixed to a center console.

FIG. 6 illustrates an alternative mounting position of the restraint element according to FIGS. 1 and 2. A vehicle 20 is shown in a top view with the vehicle 20 having seats 21 and a center console 24 disposed between the seats 21. The center console 24 accommodates restraint elements 10 that are provided for each of the driver and, resp., the passenger of the vehicle 20. The restraint elements 10 are tightly fixed with their base ends 17 in or on the center console 24 and, upon activation, in the inflated state extend transversely to the longitudinal vehicle axis in the direction of the side doors 27 of the vehicle 20. The restraint element 10 preferably deploys between the seat 21 or a backrest and the steering wheel 22 or an instrument panel, respectively, so that the vehicle occupants 30 are prevented from colliding with the steering wheel and/or the instrument panel.

Figure 7:
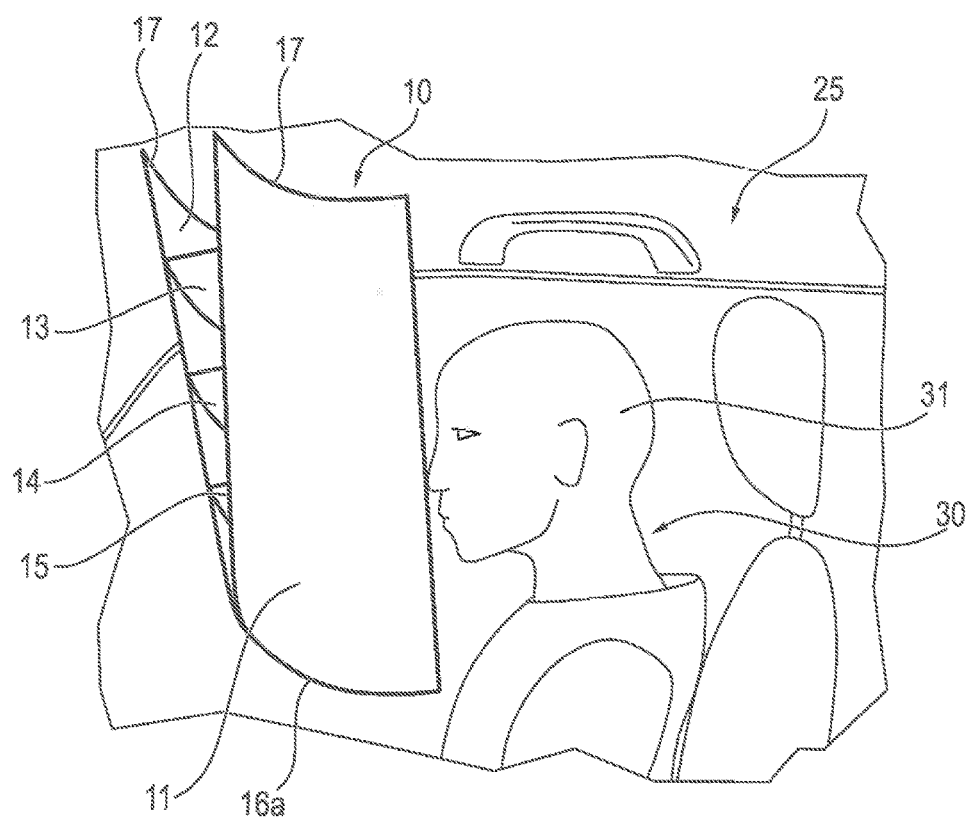
FIG. 7 shows an interior view of a vehicle comprising a restraint element according to the invention in accordance with a preferred embodiment which is fastened to the vehicle roof.

The arrangement of a restraint element 10 with respect to a vehicle occupant 30 is clearly visible in FIG. 7. The restraint element 10 shown there is fixed to the vehicle roof 23 with its base ends 17 and in the shown activated state extends vertically in the direction of the vehicle floor 26. In so doing, the restraint element 10 comes to be locate in front of the head 31 of the vehicle occupant 30 so that the head 31 of the vehicle occupant 30 bouncing forward during a frontal crash is absorbed by the restraint element 10.

Figure 8:
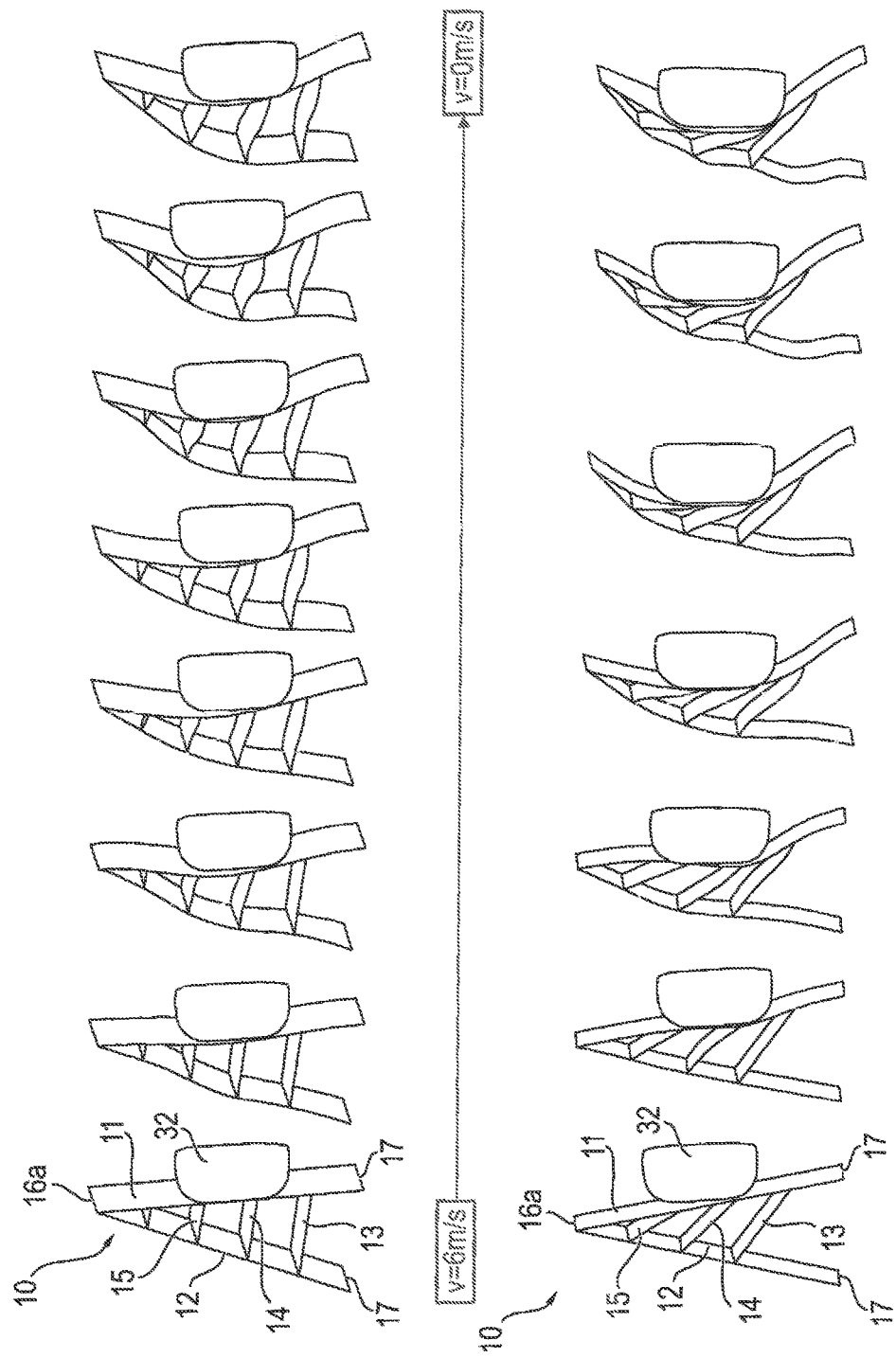
FIG. 8 shows a comparison of the dynamic behavior of restraint elements according to the invention having different skeleton-type structures when force is applied as a function of time.

FIG. 8 schematically shows the time course of the deformation of restraint elements 10 according to the invention under the effect of an impact mass 32 which simulates the impact of a vehicle occupant 30 on the restraint element 10. Accordingly, two different geometric cross-sectional designs of the restraint element 10 are compared to each other. In the upper half of the drawing of FIG. 8 the deformation of a restraint element 10 configured according to the embodiment of FIGS. 1 and 2 is shown. The lower half of the drawing shows a restraint element 10 which has a similar structure hut differs from the restraint element 10 according to FIGS. 1 and 2 by the fact that the cross braces 13, 14, 15 are net aligned in parallel to each other. Rather, the cross braces 13, 14, 15 are arranged at angles relative to each other so that the distance between the first cross brace 13 and the second cress brace 14 as well as between the second cross brace 14 and the third cross brace 15 along the front-side leg element 11 is smaller than along the rear-side leg element 12.

In FIG. 8 moreover the original impact velocity of the impact mass 32 onto the restraint element 10 is indicated to be 6 m/s. The restraint element 10 deforms by the action of the impact mass 32 so that the forward movement thereof is delayed until the impact mass 32 comes to a halt (V=0 m/s). For both variants of a restraint element 10 according to FIG. 8 it is clearly evident that the substantially central contact of the impact mass 32 with the restraint element 10 causes deformation of the restraint element 10 which entails a movement of the point 16 directed against the direction of impact. This corresponds to the fin ray effect it is also clearly evident that due to said counter-movement of the point 16 of the restraint element 10 the restraint element 10 adapts to the shape of the impact mass 32. The impact mass 32 is substantially encompassed at least partially by the restraint element 10. In this way, the impact mass 32 is achieved to be guided in its direction of movement. Thus the impact mass 32 is prevented from backing away. On the whole, a very efficient protective function of the restraint element 10 is thus resulting.

By way of comparison of the restraint elements 10 having a different geometric design in FIG. 8. It is equally evident that the active deforming behavior of the restraint element 10 can be adjusted by aligning cross braces 13, 14, 15 and leg elements 11, 12 relative to each other. In this way, different needs of various car manufacturers can be taken into account with the basic concept of the fin ray effect being maintained. Hence the advantages according to the invention are applicable to a plurality of different vehicle occupant safety systems.

In general, the restraint element 10 can be referred to as airbag because of the functional similarity. In terms of structure, the restraint element is different from conventional airbags, however, as the absorption of the impact energy is not primarily performed by gas displacement but by the mechanical and, resp., kinematic deformation of the restraint element 10 itself. In general, the restraint element 10 is suited for all applications which have been satisfied by previous airbags. Especially the restraint element 10 may be used as passenger airbag, as driver airbag, as roof airbag, as side airbag, as window bag and/or as pedestrian protection airbag. The fluid chambers formed inside the restraint element 10 which may be formed both in the cross braces 13, 14, 15 and in the leg elements 11, 12 are preferably connected to a joint inflator or to respective separate inflators. When plural inflators are used for one single restraint element 10, they may be controlled and, resp., activated at predetermined time intervals so as to allow for further adaptability of the restraint element 10. Ultimately, in the fluid chambers outlet orifices may be provided so as to realize additional adaptability also by varying the gas pressure inside the fluid chambers.

Due to the skeleton-type structure of the restraint element 10 and, resp., due to the realization of the fin ray effect in the restraint element 10, the restraint element 10 has an automatically adaptive behavior. This means that the restraint element 10 automatically adapts to a crash scenario without additional actuators, for example releasable cutters for cutting tethers inside an airbag, having to be used.

LIST OF REFERENCE NUMERALS

10 restraint element
11 front-side leg element
12 rear-side leg element
13 first cross brace
14 second cross brace
15 third cross brace
16 point
16*a* ride
17 base end
18 free space
19 connecting area
20 vehicle
21 seat
22 steering wheel
23 vehicle roof
24 center console
25 interior
26 vehicle floor
27 side door
30 vehicle occupant
31 head
32 impact mass
L axis of rotation

The invention claimed is:

1. An adaptive deployable restraint element (10) for a vehicle safety system to protect a vehicle occupant comprising at least two leg elements (11, 12) at least in portions arranged substantially in V-shape relative to each other between which at least one cross brace (13, 14, 15) is arranged for connecting the leg elements (11, 12), wherein the leg elements and/or the cross brace (13, 14, 15) are/is inflatable, wherein the leg elements (11, 12) are arranged such that they have a front-side leg element (11) and a rear side leg element (12), wherein the front-side leg element (11) faces the vehicle occupant and the rear-side leg element (12) is turned away from the vehicle occupant.

2. The restraint element (10) according to claim 1, wherein the restraint element (10) has an outer contour triangular or diamond-shaped in cross-section.

3. The restraint element (10) according to claim 1, wherein the restraint element has an outer contour which is circular or oval or longitudinally curved in a longitudinal section.

4. The restraint element (10) according to claim 1, wherein the leg elements (11, 12) are formed by a textile or by plural interconnected textiles.

5. The restraint element (10) according to claim 1, wherein the leg elements (11, 12) converge into a joint point (16).

6. The restraint element (10) according to claim 5, wherein between the leg elements (11, 12) plural cross braces (13, 14, 15) are arranged, wherein the length of the cross braces (13, 14, 15) is reduced toward the joint point (16).

7. The restraint element (10) according to claim 6, wherein in cross-section of the restraint element (10), the cross braces (13, 14, 15) are arranged forming rungs between the leg elements (11, 12).

8. The restraint element (10) according to claim 6, wherein the cross braces (13, 14, 15) are arranged in parallel relative to each other.

9. The restraint element (10) according to claim 6, wherein spaces between the cross braces (13, 14, 15) along a rear-side leg element (12) are larger than along a front-side leg element (11).

10. The restraint element (10) according to claim 6, wherein between two adjacent cross braces (13, 14, 15) at least one free space (18) is provided, wherein a height of the free space (18) is many times larger than a thickness of the cross braces (13, 14, 15) and/or of the leg elements (11, 12).

11. The restraint element (10) according to claim 1, wherein each cross brace (13, 14, 15) forms an individual fluid chamber which is connected to the leg elements (11, 12) in a fluid-tight manner.

12. The restraint element (10) according to claim 1, wherein a connecting area (19) is arranged between each of the cross braces (13, 14, 15) and the leg elements (11, 12), and wherein a fluid communication at each of the connecting areas (19) between the cross braces (13, 14, 15) and the leg elements (11, 12) is tapered or closed in a gastight manner.

13. The restraint element (10) according to claim 1, wherein the leg elements (11, 12) are directly fluid-communicated with each other so that they form a V-shaped fluid chamber.

14. The restraint element (10) according to claim 13, wherein the at least one cross brace or, respectively, the cross braces (13, 14, 15) are fluid-communicated with the V-shaped fluid chamber of the leg elements (11, 12) in such way that the restraint element (10) forms a joint airbag.

15. A vehicle safety system for a vehicle (20) comprising a restraint element (10) according to claim 1.

16. The vehicle safety system according to claim 15, wherein the restraint element (10) includes two base ends (17) and a point (16) opposed to the base ends, wherein the base ends (17) can be or are fixed within the vehicle (20) in a stationary manner and the point (16) projects freely into an interior (25) of the vehicle (20) in a deployed state of the restraint element (10).

17. The vehicle safety system according to claim 15, wherein the restraint element (10) is connected to a vehicle roof (23) and in the deployed state extends through the interior (25) in the direction of a vehicle floor (26).

18. The vehicle safety system according to claim 15, wherein the restraint element (10) is fixed between two seats (21) juxtaposed in the driving direction and in the deployed state extends across a seat (21).

19. A method for protecting a vehicle occupant (30) against impact, comprising:
providing an adaptive deployable restraint element (10) according to claim 1; and
configuring the inflatable leg elements (11, 12) and cross braces (13, 14, 15) to respond to an impacting occupant according to the fin ray effect so that portions of the restraint element adjacent the impacting occupant move in a direction opposite the direction that the impacting occupant deforms the restraint element.

20. An adaptive deployable restraint element (10) for a vehicle safety system comprising a structure having one or more fluid chambers, wherein the structure is configured so that the restraint element (10) exerts a movement and/or curvature according to the fin ray effect directed against a force pulse at least in portions by the effect of the force pulse.

21. The adaptive restraint element (10) according to claim 20, wherein the restraint element (10) comprises at least two leg elements (11, 12) at least in portions arranged substantially in V-shape relative to each other between which at least one cross brace (13, 14, 15) is arranged for connecting the leg elements (11, 12), wherein the leg elements and/or the cross brace (13, 14, 15) are/is inflatable, wherein the leg elements (11, 12) are arranged such that they have a front-side leg element (11) and a rear side leg element (12), wherein the front-side leg element (11) faces a vehicle occupant and the rear-side leg element (12) is turned away from the vehicle occupant.

22. An airbag module comprising a restraint element (10) according to claim 20 and an inflator which is fluid-communicated with a cross brace (13, 14, 15) and/or a leg element (11, 12) and/or a fluid chamber of the restraint element (10).

23. A vehicle safety system for a vehicle (20) comprising an airbag module according to claim 22.

* * * * *